US011919656B2

(12) United States Patent
Christy et al.

(10) Patent No.: US 11,919,656 B2
(45) Date of Patent: Mar. 5, 2024

(54) CONDUCTIVE BROAD GOOD PROVIDING LIGHTNING STRIKE PROTECTION

(71) Applicant: GENERAL NANO LLC, Cincinnati, OH (US)

(72) Inventors: Larry Allen Christy, Cincinnati, OH (US); Joseph E. Sprengard, Jr., Cincinnati, OH (US); Jae Hak Kim, Mason, OH (US); Chaminda Jayasinghe, Cincinnati, OH (US)

(73) Assignee: General Nano LLC, Cincinnati, OH (US)

( * ) Notice: Subject to any disclaimer, the term of this patent is extended or adjusted under 35 U.S.C. 154(b) by 721 days.

(21) Appl. No.: 16/632,736

(22) PCT Filed: Jul. 20, 2018

(86) PCT No.: PCT/US2018/043069
§ 371 (c)(1),
(2) Date: Jan. 21, 2020

(87) PCT Pub. No.: WO2019/018754
PCT Pub. Date: Jan. 24, 2019

(65) Prior Publication Data
US 2020/0165005 A1  May 28, 2020

Related U.S. Application Data

(60) Provisional application No. 62/535,365, filed on Jul. 21, 2017.

(51) Int. Cl.
B64D 45/02 (2006.01)
C25D 3/12 (2006.01)
(Continued)

(52) U.S. Cl.
CPC .............. B64D 45/02 (2013.01); C25D 3/12 (2013.01); D06M 10/06 (2013.01); D06M 11/83 (2013.01); D06M 2101/40 (2013.01)

(58) Field of Classification Search
CPC ..................................................... B64D 45/02
See application file for complete search history.

(56) References Cited

U.S. PATENT DOCUMENTS 4,169,911 A * 10/1979 Yoshida ................ D06M 15/00
96/1
4,522,889 A   6/1985 Ebnerth et al.
(Continued)

FOREIGN PATENT DOCUMENTS

CN   1130223 A   9/1996
CN   1345996 A   4/2002
(Continued)

OTHER PUBLICATIONS

International Search Report and Written Opinion dated Feb. 25, 2021, in related International Application No. PCT/US2020/058051 filed Oct. 29, 2020 (9 pages).
(Continued)

Primary Examiner — Adam Krupicka
(74) Attorney, Agent, or Firm — Daniel F. Nesbitt; Nesbitt IP LLC

(57) ABSTRACT

A broad good, comprising a plurality of fibers looped randomly throughout the broad good, a binder material binding the plurality of fibers together, the plurality of bound fibers forming a dimensionally stable nonwoven veil, a first metal coating covering a surface of the plurality of bound fibers of the veil, and a second metal coating covering the surface of the first metal coating, wherein the first and
(Continued)

second metal coatings form a highly conductive metal screen that follows the shape of the dimensionally stable nonwoven veil.

25 Claims, 7 Drawing Sheets

(51) Int. Cl.
*D06M 10/06* (2006.01)
*D06M 11/83* (2006.01)
*D06M 101/40* (2006.01)

(56) References Cited

U.S. PATENT DOCUMENTS

| | | | |
|---|---|---|---|
| 4,546,033 | A | 10/1985 | Tsuchimoto et al. |
| 4,752,415 | A | 6/1988 | Iwaskow et al. |
| 7,208,115 | B2 | 4/2007 | Sheridan et al. |
| 2005/0039937 | A1 | 2/2005 | Yeh et al. |
| 2010/0203789 | A1 | 8/2010 | Takebayashi et al. |
| 2011/0017867 | A1 | 1/2011 | Simmons et al. |
| 2013/0048331 | A1 | 2/2013 | Fornes et al. |
| 2014/0011414 | A1 | 1/2014 | Kruckenberg et al. |
| 2014/0080378 | A1 | 3/2014 | Wasynczuk |
| 2014/0151111 | A1 | 6/2014 | Shah et al. |
| 2016/0319471 | A1 | 11/2016 | Lee et al. |
| 2017/0204519 | A1 | 7/2017 | Kwag et al. |
| 2017/0291332 | A1 | 10/2017 | Braley et al. |

FOREIGN PATENT DOCUMENTS

| | | | |
|---|---|---|---|
| CN | 1587494 | A | 3/2005 |
| CN | 1693576 | A | 11/2005 |
| CN | 101375652 | A | 2/2009 |
| CN | 102817232 | A | 12/2012 |
| CN | 102905888 | A | 1/2013 |
| CN | 104011287 | A | 8/2014 |
| CN | 104695212 | A | 6/2015 |
| EP | 0 109 638 | | 5/1984 |
| EP | 0264771 | A2 | 4/1988 |
| EP | 0 629 549 | | 12/1994 |
| EP | 3178966 | A1 | 6/2017 |
| EP | 3235632 | A1 | 10/2017 |
| JP | H11220283 | A | 8/1999 |
| JP | 2005-59580 | A | 3/2005 |
| JP | 2008-255415 | A | 10/2008 |
| JP | 2011-519749 | A | 7/2011 |
| JP | 2017-526816 | A | 9/2017 |
| WO | 2010120426 | | 10/2010 |
| WO | 2015093777 | | 6/2015 |

OTHER PUBLICATIONS

International Search Report and Written Opinion of the International Searching Authority dated Dec. 17, 2018 for corresponding International Application No. PCT/US2018/043069, filed Jul. 20, 2018 (13 pages).

Di Bari, George A., "Chapter 3—Electrodeposition of Nickel", Modern Electroplating, $5^{th}$ ed., 2010, pp. 79-114 (36 pages).

SAE Aerospace, "ARP5414 Rev. A—Aircraft Lightning Zone", Aerospace Recommended Practice, SAE International, 2012 (33 pages).

TFP Ltd., "Metal Coated Veils and Mats", Oct. 21, 2016, obtained from the Wayback Machine, http://web.archive.org/web/20161021025831/http://www.tfpglobal.com:80/materials/metal-coated (2 pages).

TFP Ltd., "Optimat® Technical Data Sheet—20404E Nickel Coated Carbon Mat", Jan. 2015, obtained Aug. 25, 2020 (2 pages).

TFP Ltd., "Optimat® Technical Data Sheet—20444A Copper & Nickel Coated Carbon Mat", Jan. 2015, obtained Aug. 25, 2020 (2 pages).

TFP Ltd., "Electrical Conductivity & Resistivity", brochure obtained Aug. 25, 2020 (1 page).

Abys, Joseph A., "Chapter 12—Palladium Electroplating", Modern Electroplating, 5th ed., 2010, 327-368 (42 pages).

Krulik, G.A., *Tin-Palladium Catalysts for Electroless Plating*, 26 Platinum Metals Review 58-64, 1982 (7 pages).

U.S. Appl. No. 17/084,537, filed Oct. 29, 2020, General Nano LLC.

First Office Action dated Dec. 8, 2021 in related European Application No. 18774184.0 filed Jul. 20, 2018 (5 pages).

First Office Action dated Aug. 9, 2022 in related Japanese Application No. 2020-502659 filed Jul. 20, 2018 (2 pages) with English translation (3 pages).

Non-Final Office Action dated Mar. 7, 2023 in related U.S. Appl. No. 17/084,537, filed Oct. 29, 2020 (14 pages).

First Office Action dated Mar. 18, 2022 in related Chinese Application No. 201880060607.5 filed Mar. 18, 2020 (7 pages) with English translation (12 pages).

International Preliminary Report on Patentability dated May 12, 2022 in related International Application No. PCT/US2020/058051 filed Oct. 29, 2020 (7 pages).

* cited by examiner

CONDUCTIVE BROAD GOOD PROVIDING LIGHTNING STRIKE PROTECTION

CROSS-REFERENCE TO RELATED APPLICATIONS

The present application is the National Stage of International Application No. PCT/US2018/043069 filed Jul. 20, 2018, which claims the benefit of U.S. Provisional Application No. 62/535,365 filed Jul. 21, 2017, the disclosures of which are incorporated herein by reference in their entireties.

TECHNICAL FIELD

The present disclosure is related to composite materials and, more particularly, to a broad good providing lightning strike protection.

BACKGROUND

Aerospace vehicles are being designed and manufactured with greater percentages of composite materials. For example, composites may be used in the construction of various primary and secondary structures in aerospace applications, such as composite panels forming the airframe and/or exterior skin, e.g., fuselage, wings, etc., of an aircraft. Use of composites may increase the strength, decrease the weight, provide functional performance properties, and provide a longer service life of various components of the aerospace vehicle.

However, aerospace vehicles having composite components, such as skin panels, may require application of additional materials for lightning strike protection and/or to shield associated avionics and electronics from external electromagnetic interference. Such additional materials may undesirably increase the weight of the aerospace vehicle and increase the time and cost of production.

Further, some approaches to providing lightning strike protection have come up short in critical areas of aerospace vehicles such as those surfaces where a first return is likely during lightning channel attachment with a low expectation of flash hang on, e.g., a first return strike zone, defined as Zone 1A by SAE Aerospace Recommended Practices 5414. For example, one approach to making a conductive composite material has been to take metalized carbon fibers or tows, typically metalized with nickel, chop the coated fibers to a length of 0.1 millimeters (mm) up to 25.4 millimeters or more (mm), and form additively by bonding, a carbon fiber veil to be used in the construction of an airframe skin. When constructed in this manner, the chopped fibers create, in effect, a discontinuous metal structure with a resistance that is too high to provide effective lightning strike protection in critical areas such as Zone 1A.

Accordingly, those skilled in the art continue with research and development efforts in the field of composite materials.

SUMMARY

The present invention provides a broad good, comprising a plurality of fibers looped randomly throughout the broad good, a binder material binding the plurality of fibers together, wherein the plurality of bound fibers forming a dimensionally stable nonwoven veil, a first metal coating covering a surface of the plurality of bound fibers of the veil, and a second metal coating covering the surface of the first metal coating, wherein the first and second metal coatings form a highly conductive metal screen that follows the shape of the dimensionally stable nonwoven veil.

In one embodiment, a broad good comprises a broad good sheet.

In another embodiment, a surfacing ply for aerospace applications, comprises a veil mat that including a plurality of randomly oriented, intertwined fibers, a first metal coating covering a surface of the fibers, and a second metal coating covering the surface of the first metal coating, wherein the first and second metal coatings form a highly conductive metal screen that conforms to the fibers of the veil mat.

In another embodiment, a lightweight highly conductive sheet, comprises a metal-coating carrier including a plurality of randomly intertwined fibers, a first metal coating covering the fibers of the carrier, and a second metal coating covering the surface of the first metal coating, wherein the first and second metal coatings form a highly conductive metal screen that follows the carrier.

In another embodiment of the invention, the binder is at least one of an acid-resistant binder material and a base resistant-binder material.

In another embodiment of the invention, the plurality of fibers are carbon fibers.

In another embodiment of the invention, the first metal coating can comprise a first metal that can be corroded by either galvanic reaction with carbon or exposure to salt environments. The second metal can prevent the galvanic reaction or said exposure of the first metal coating.

In another embodiment of the invention, the first metal coating comprises copper and the second metal coating comprises nickel.

In another embodiment of the invention, the first metal coating covers at least a portion of the surface of the plurality of fibers and the binder material. The second metal coating covers, and preferably completely covers, the surface of the first metal coating.

In another embodiment of the invention, the second metal coating comprises a nickel sulfamate based electroplated (EP) nickel.

In another embodiment of the invention, the first metal coating comprises copper and has a basis weight of approximately 10-50 g/m$^2$ of the broad good, and the second metal coating comprises nickel and has a basis weight of approximately 5-20 g/m$^2$ of the broad good.

In another embodiment of the invention, the broad good when appropriately used in the construction of an aircraft is able to withstand the direct and indirect effects of a 200,000 ampere lightning strike which either attaches directly to the aircraft or occurs nearby and endure an action integral of $2.0 \times 10^6$-$2.5 \times 10^6$ Amp$^2$-sec.

In another embodiment of the invention, the basis weight of the broad good is less than 60 g/m$^2$.

In another embodiment of the invention, the basis weight of the broad good is less than 60 g/m$^2$ and the sheet resistance of the broad good is less than 0.015 Ω/□.

In yet another embodiment of the invention, the random looping of the plurality of fibers provides a shielding effect of greater than 75 dB in the LF-band (30 kHz-300 kHz) and greater than approximately 70 dB in the S-band (2 GHz-4 GHz).

In still another embodiment of the invention, the broad good has a width of 12 inches or more.

BRIEF DESCRIPTION OF THE DRAWINGS

Various embodiments of a broad good offering lightning strike protection will become better understood with regards to the following description, appended claims and accompanying drawings wherein:

DETAILED DESCRIPTION

Figure 1:
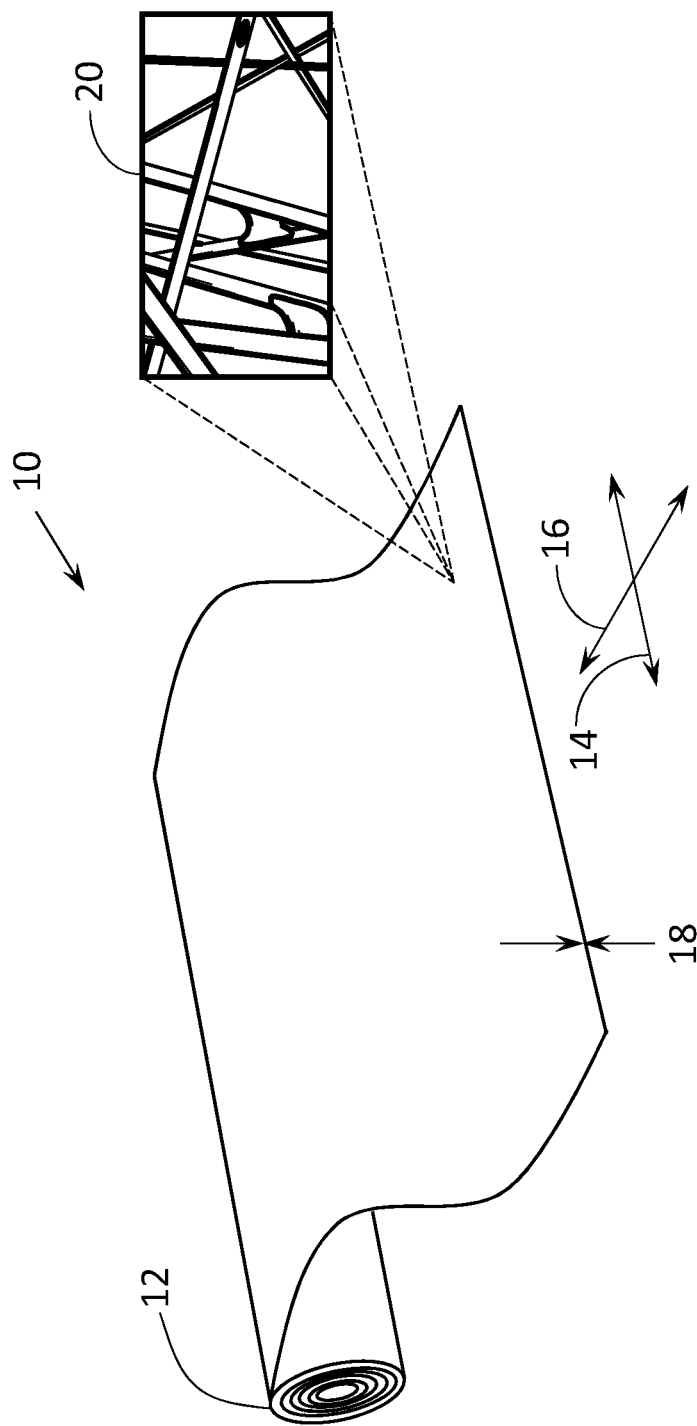
FIG. 1 is a perspective view of a broad good according to present invention.

FIG. 1 is a perspective view of a broad good 10 in accordance with a first embodiment of the present invention. As depicted, the broad good 10 may be manufactured and supplied in a roll 12, as is common in the composite material industry, having a width 14 and a length 16, typically specified in inches and yards (or centimeters and meters), respectively. Thus, when supplied, the width 14 of broad good 10 is generally much less than the length 16; however, in other embodiments, this may not be the case. For example, in one embodiment, a broad good could comprise a broad good sheet.

More specifically, the width 14 can define the broad good 10. As used hereinafter, a broad good refers to standard and/or wider widths, especially in distinction from ribbons, bands, tows, or trimmings. The broad good 10 typically has a width of 12 inches (about 30.5 cm) or more. For example, a purchaser of the broad good 10 might buy a standard width of 3 to 36 inches (about 8 to 76 cm) based on the broad good 10 coverage needed for an aerospace application, such as an airframe and/or exterior skin, an aircraft fuselage, wings, etc., using automated tape layup and up to 60 inches (about 152 cm) in width for hand layup. Those skilled in the art will appreciate that the present invention is not limited to a specific width; but rather, the width 14 may be varied among standard and/or wider widths as desired without departing from the spirit of the present invention.

For example, a production line for manufacturing a broad good in accordance with principle of the present invention can produce a broad good that is 12 inches (about 30.5 cm), 24 inches (about 61 cm), 36 inches (about 94 cm) or 60 inches (about 152 cm) wide.

The broad good 10 also has a sheet thickness 18. The sheet thickness 18 is typically quite small relative to the width 14 and the length 16. In the embodiment shown, the sheet thickness 18 is on the order of 0.075 millimeters (mm) or 75 micrometers (μm). Those skilled in the art will appreciate that the sheet thicknesses may be varied as desired without departing from the spirit of the present invention.

Figure 2:
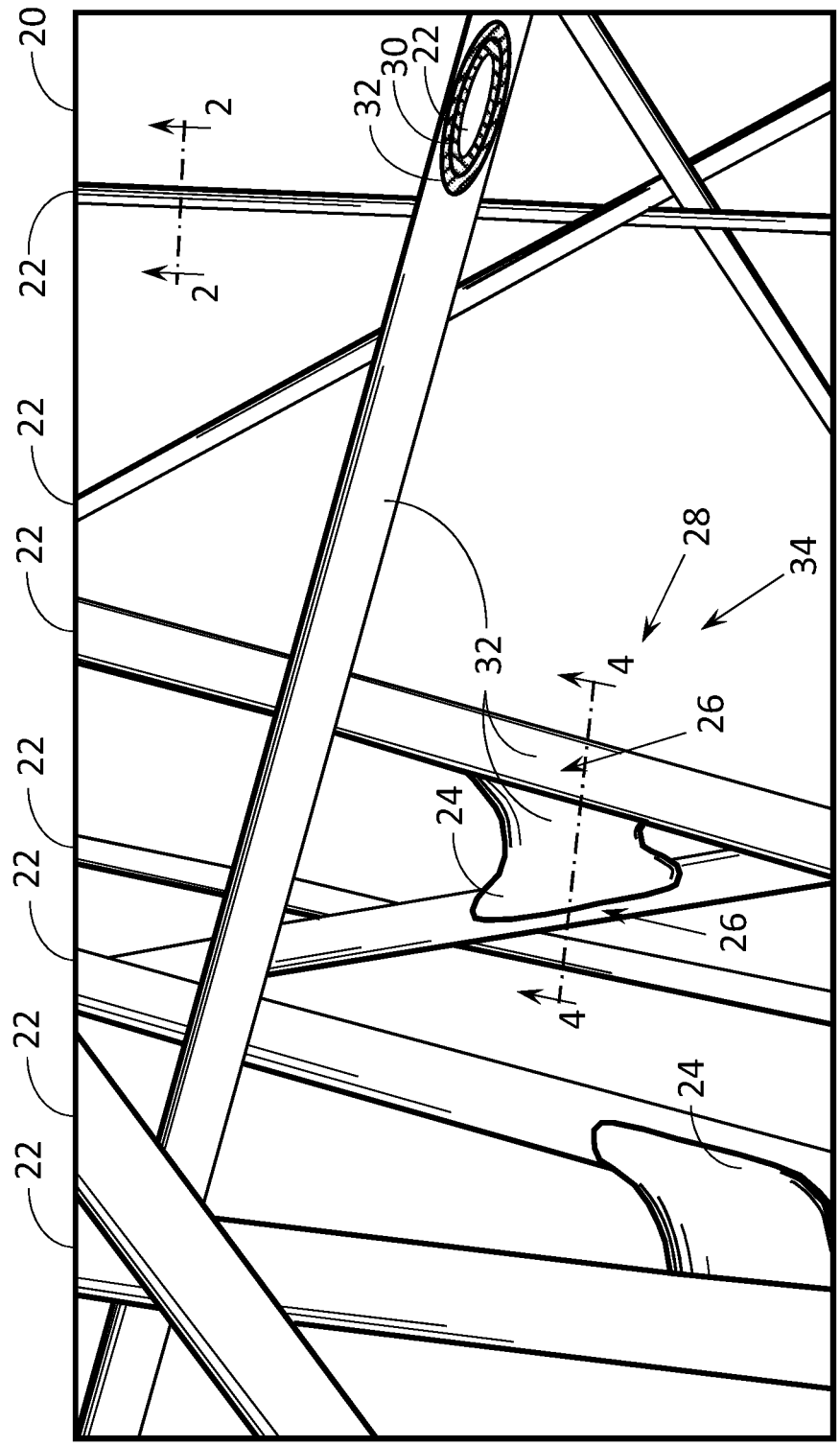
FIG. 2 is a detailed perspective view of the broad good shown in FIG. 1.

Referring now also to FIG. 2, a detailed perspective view 20 of the broad good 10 is provided. Generally, FIG. 2 shows a plurality of fibers 22 disbursed evenly or looped randomly throughout the broad good 10. As shown, each strand fiber 22 is relatively small in diameter compared to its length. For example, in some embodiments, a strand fiber 22 may have a diameter between 1-10 micrometers (μm), while its length may be 10,000 micrometers (μm) or more. This represents an aspect ratio of 10,000:1 (or greater) to 1,000:1. Due to these relative dimensions, the plurality of randomly dispersed, entangled, looped or entwined fibers 22 may appear straight, such as in FIG. 2, due to the enlargement or scale of the detailed perspective view 20.

The plurality of fibers 22 may be made from one or more of a variety of materials. Those materials be selected from the group consisting of, though not necessarily limited to, aramid (e.g., Kevlar®), carbon, fiberglass, glass, graphene, carbon nanotubes, silicon carbide, nylon, and polyester, and combinations thereof. In a preferred embodiment of the present invention, the fibers 22 are carbon fibers as shown herein.

A binder material 24 can be used to hold or bind each of the plurality of fibers 22 together at a plurality of proximal points 26, forming a dimensionally stable nonwoven veil 28. In one embodiment, the dimensionally stable nonwoven veil 28 or veil mat comprises the plurality of fibers 22 and the binder material 24. In a preferred embodiment of the present invention, the binder material 24 is an acid resistant material, a base resistant material, or an acid-and-alkali resistant material. An acid resistant material, as used herein, is a binder material that is resistant to hydrochloric acid (HCl), meaning that when the binder material 24 is contacted with a solution of hydrochloric acid, the binder material resists chemical attack which could cause the plurality of bound fibers 22 to come apart, and/or cause the general shape of the dimensionally stable nonwoven veil 28 to be significantly distorted. An acid- and/or alkali-resistant binder material can selected from the group consisting of, though is not limited to, acrylonitrile butadiene styrene (ABS), acetal, acrylic, cellulose acetate butyrate (CAB), chlorinated polyvinyl chloride (CPVC), ethylene chlorotrifluoroethylene (ECTFE), Fluorosint, polyamide (nylon), polyether ether ketone (PEEK), polyethylene terephthalate (PET), polycarbonate, polypropylene, polysulfone, polyphenylene (PPS), polyvinyl chloride (PVC), polyvinyl alcohol (PVA), polyvinylidene fluoride or polyvinylidene difluoride (PVDF), polytetrafluoroethylene (PTFE), Tecator, styrene acrylic, phenoxy, polyurethane, polyimide, fluorinated ethylene propylene (FEP), cross-linked polyester, styrene acrylic, co-polyester, and ultrahigh molecular weight polyethylene (UHMPE or UHMW), and combinations thereof.

In an embodiment of the present invention, the dimensionally stable nonwoven veil 28 comprising of the plurality of fibers 22 and the binder material 24 may be purchased in the form of a nonwoven carbon fiber veil. Suppliers of nonwoven carbon fiber veils include Technical Fibre Products, headquartered in Burneside, England, and Hollingsworth & Vose, headquartered in Massachusetts. Such veils are typically specified in an aerial weight or a weight per unit area, e.g., grams per square meter ($g/m^2$). Nonwoven carbon fiber veils are typically available with aerial weights between about 2 grams per square meter ($g/m^2$) and about 50 grams per square meter ($g/m^2$). These nonwoven carbon fiber veils are not intended to carry structural loads, like heavier fabrics used in conventional load-bearing composite structures with aerial weights typically greater than about 70 grams per square meter ($g/m^2$). Rather, these nonwoven carbon fiber veils are used for surface finishing or providing a smooth outer surface for a composite structure with minimal processing and fiber pattern bleed through. A smooth outer surface is particularly import in airfoils, such as airplane wings. Further, minimizing fiber pattern bleed through reduces the amount of paint required to provide a clean esthetic appearance.

One embodiment of the present invention, as taught herein, provides metalizing a nonwoven carbon fiber veil in a highly conductive continuous manner that allows for the locating of lightning strike protection in the finishing layer or outermost surface of a composite structure, such as the leading edge of an airplane wing. As will be appreciated by one of ordinary skill in the art, this makes the lightning strike protection more effective by minimizing capacitance, burn through, delamination, etc. In another embodiment, incorporating lightning strike protection in a nonwoven carbon fiber veil allows for minimal finish processing and reduces the amount of paint required to prevent bleed through further reducing capacitance, burn through, delamination, etc.

In one embodiment, a nonwoven carbon fiber veil with the specification of 10 grams per square meter (g/m$^2$) may be selected. Again, the sheet thickness can be on the order of 0.075 millimeters (mm) or 75 micrometers (μm). In a nonwoven carbon fiber veil with the specification of 10 grams per square meter (g/m$^2$), the binder material 24 can comprise about 5 to 10% of the total weight, meaning approximately 0.5 to 1.0 grams per square meter (g/m$^2$), leaving approximately 9.0 to 9.5 grams per square meter (g/m$^2$) for carbon fiber.

Figure 3:
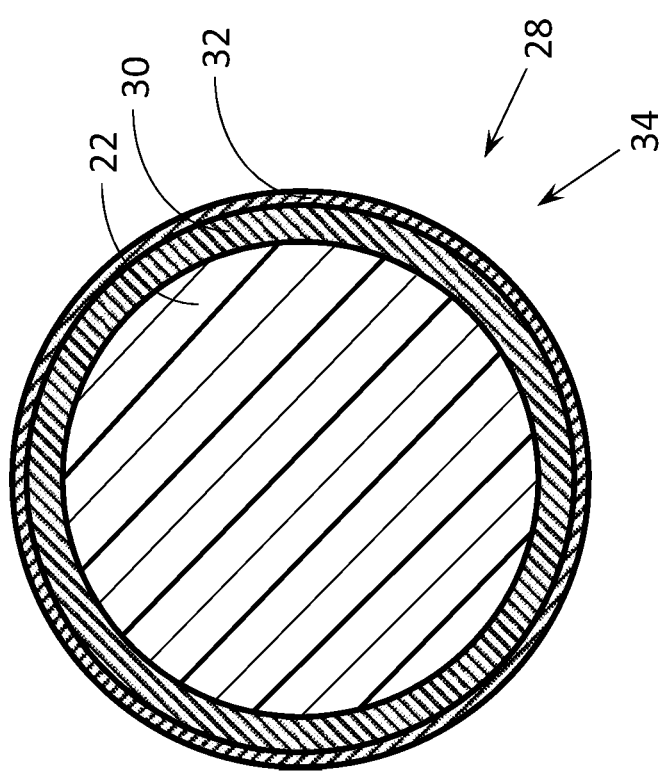
FIG. 3 is a cross sectional view of a fiber taken along section line 2-2 shown in FIG. 2; and, FIG. 4 is a cross sectional view of two fibers, bound by a binder material, taken along section line 4-4 shown in FIG. 2.

Referring to FIGS. 2 and 3, a first metal coating 30 is formed over or envelopes or coats the surfaces or covers the surface of the fibers 22 and the binder material 24, that form the dimensionally stable nonwoven veil 28, followed by a second metal coating 32 over the first metal coating 30. It will be understood that the first metal coating 30 is different than the second metal coating 32. In one embodiment, the first metal coating 30 covers at least a portion, or at least substantially all, of the surface of the fibers 22 and the binder material 24, that form the dimensionally stable nonwoven veil 28. It will be understood that the first metal coating 30 need not necessarily cover all of the dimensionally stable nonwoven veil 28, but that it should provide uniform conductivity. It will be further understood that the second metal coating 32 covers substantially all or all of the first metal coating 30. The first and second metal coatings 30, 32 form a highly conductive metal screen 34 having low resistivity.

FIG. 3 illustrates a cross section of a continuous metal coated strand fiber. More specifically, the strand fiber 22 has a first metal coating 30 and a second metal coating 32. Again, in this embodiment of the present invention, the strand fiber 22 is a carbon fiber that can be part of, for example, a 10 gram per square meter (g/m$^2$) nonwoven carbon fiber veil. In one embodiment of the present invention, the first metal coating 30 comprises copper and the second metal coating 32 comprises nickel. Further, in keeping with the general specification for veils, the basis weight of the first metal coating 30 comprising copper is approximately 30 g/m$^2$, while the basis weight of the second metal coating 32 comprising nickel is approximately 10 g/m$^2$. Assuming uniform coating, this translates to a thickness of approximately 3.35 micrometers (μm) for the first metal coating 30 comprising copper and approximately 1.12 micrometers (μm) for the second metal coating 32 comprising nickel, based on maximum current densities of approximately 100 amperes per square millimeter (A/mm$^2$) for copper and approximately 43 amperes per square millimeter (A/mm$^2$) for nickel, using a charge densities of approximately 8.69 grams per square millimeter (g/mm$^2$) and 8.91 grams per square millimeter (g/mm$^2$) for copper and nickel, respectively.

Thus, to summarize, for the broad good 10 shown, the weight of the components can be approximately 10 grams per square meter (g/m$^2$) for the dimensionally stable nonwoven veil 28, approximately 30 grams per square meter (g/m$^2$) for the first metal coating 30, comprising copper, and approximately 10 grams per square meter (g/m$^2$) for the second metal coating 32, comprising nickel, and the total weight of broad good 10 is approximately 50 grams per square meter (g/m$^2$), or less than 60 grams per square meter (g/m$^2$). This is referred to hereinafter as 20 milliohm per square (mΩ/☐) broad good with a total basis weight of 50 grams per square meter (mΩ/☐). Table 1 below shows the resistance and weights for the 20 milliohm per square (mΩ/☐) broad good with a total basis weight of 50 grams per square meter (mΩ/☐), as well as 40 milliohm per square (mΩ/☐) broad good with a total basis weight of 22 grams per square meter (mΩ/☐), 10 milliohm per square (mΩ/☐) broad good with a total basis weight of 37 grams per square meter (mΩ/☐), and 2 milliohm per square (mΩ/☐) broad good with a total basis weight of 77 grams per square meter (mΩ/☐), all of which utilize a 10 gram per square meter (mΩ/☐) nonwoven carbon fiber veil and have a second metal coating of nickel with a basis weight of 10 grams per square meter (mΩ/☐), the thickness or the basis weight of first metal coating of copper being changed in each embodiment to vary the resistivity or conductivity. Further, a person of ordinary skill in the art can select a particular broad good in accordance with principles of the present invention for a particular application, such as Zone 1A lightning strike protection on the leading edge of an airplane wing, for example, based on either the resistance per square meter or the basis weight, or a combination thereof.

TABLE 1

Exemplary Embodiments Of The Present Invention

| Resistance (mΩ/☐) | Carbon Fiber Veil Weight (g/m$^2$) | Copper Weight (g/m$^2$) | Nickel Weight (g/m$^2$) | Broad Good Weight (g/m$^2$) |
|---|---|---|---|---|
| 20 | 10 | 30 | 10 | 50 |
| 40 | 10 | 2 | 10 | 22 |
| 10 | 10 | 17 | 10 | 37 |
| 2 | 10 | 57 | 10 | 77 |

Those of ordinary skill in the art will also appreciate that other metals may be used without departing from the spirit of the present invention. In one embodiment, a metal that exhibits excellent electrical conductivity and ductility is preferred for either or both the first and second metal coatings 30, 32. Excellent electrical conductivity is associated with low resistivity and greater current carrying capability and, thereby, increases the lightning strike protection capabilities of the broad good 10. A more ductile metal is advantageous allowing the broad good 10 to more readily follow complex contours in composite panels forming the airframe and/or exterior skin, e.g., fuselage, wings, etc., of an aircraft.

Some metals, such as copper, silver, some aluminums, certain alloys, and some steels, with excellent conductivity and ductility can galvanically interact with the carbon fiber in other layers of a composite panel, compromising the structural strength of the carbon fiber. Some metals, such as copper, silver, some aluminums, certain alloys, and some steels, also tend to corrode in salt environments or corrode galvanically with carbon or oxidize almost instantly in air, which can increase their resistivity and, thereby, reduce and/or compromise the lightning strike protection capability of the broad good 10. This is of particular concern because broad good 10 allows for the location of lightning strike protection in the finishing layer or outermost surface of a composite structure, such as an airplane wing, where oxidation or corrosion is more likely to occur.

The present invention addresses these and other possible concerns by providing a continuous, uninterrupted, second metal coating 32 over the first metal coating 30 or a metal overlay that can corrode. The second metal coating 32 prevents the metal material of the first metal coating from galvanically interacting with the carbon fiber in other layers of a composite panel as well as preventing the exposure of the first metal coating 30 to external elements. Further, there is no galvanic interaction between the nickel and the carbon fiber in other layers of a composite panel. Nickel is also corrosion resistant in salt environments and does not oxidize readily in air. This further allows for the location of lightning strike protection in the finishing layer or outermost surface of a composite structure, such as an airplane wing.

Further, in one embodiment, the first metal coating need not necessarily completely coat the fibers in the broad good, some gaps in the first metal coating or portions of the first metal coating that do not completely cover the fibers in the broad good can be tolerated. The formation of a highly conductive metal screen that follows the shape of the fibers in the broad good can still be sufficient enough to provide the conductivity necessary for a particular application. Moreover, the second metal coating can function to bridge any gap or discontinuity in the first metal coating thereby furthering the formation of the highly conductive metal screen.

Similarly, in one embodiment, the second metal coating need not necessarily completely coat the first metal coating and/or fibers in the broad good, some gaps in the second metal coating can also be tolerated. Again, the formation of a highly conductive metal screen that follows the shape of the fibers in the broad good can still be sufficient enough to provide the conductivity required for a particular application and the second metal coating can still be sufficient enough to prevent significant galvanic interaction with other layers of a composite panel.

It has been found that for the embodiments shown in Table 1, no special handling requirements are necessary, as compared to other carbon fiber composite materials. Numerous lightning strike test panels including a broad good in accordance with principles of the present invention and other carbon fiber composite sheets have been built, and no special handling was required in the processing.

Furthermore, one or more of the embodiments shown in Table 1 have also been subjected to repeated bending and/or flexing without breaking or any apparent loss in physical or electrical performance. Again, customary handling by one of ordinary skill in the art was used.

Although nickel is corrosion and wear resistant, nickel is not typically thought of as being particularly ductile. However, for example, nickel sulfamate based electroplated (EP) nickel is more ductile than nickel sulfate based electroplated (EP) nickel, i.e., Watts nickel, nickel sulfamate being similar to nickel sulfate except that one of the hydroxyl groups has been replaced by an amido group. See Milan Paunovic & Mordechay Schlesinger, MODERN ELECTROPLATING (2010), incorporated by reference herein in its entirety. In one embodiment of the present invention, the second metal coating 32 comprises a nickel-sulfamate based electroplated (EP) nickel.

Essentially, by using two metal coatings 30, 32 with dissimilar, complimentary and/or synergistic characteristics, provides a broad good 10 having the benefits of both metals. For example, the first metal coating comprising a highly conductive, ductile metal, such as copper or silver, can operate to prevent a less ductile second metal coating material, such as nickel sulfamate based electroplated (EP) nickel or nickel sulfate based electroplated (EP) nickel, from reaching its yield point. Thus, broad good 10 exhibits excellent conductivity, with low associated resistance, and enhanced ductility and corrosion resistance, while being particularly suited for used in carbon composite structures and, in particular, in the outer most layers thereof.

Figure 4:
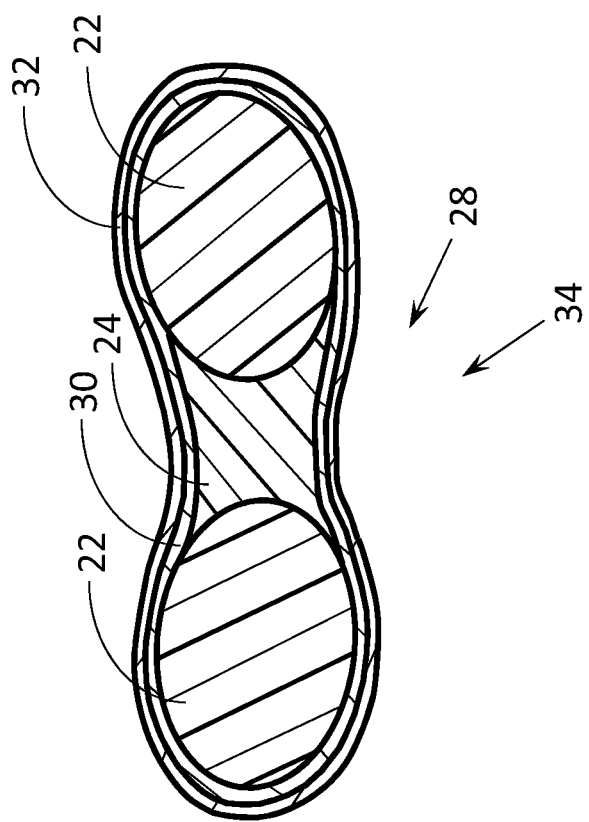

In a further embodiment, FIG. 4 shows a section taken along line 4-4 in Figure. In general, FIG. 4 shows two fibers 22 bound by the binder material 24 forming a portion of the dimensionally stable nonwoven veil 28. FIG. 4 shows the detail of how first and second metal coatings 32, 34 are formed over the plurality of bound fibers 28. As shown, the first and second metal coatings 30, 32, each completely and continuously cover the fibers and the binder material 24 forming a highly conductive metal screen 34 that follows the shape of a dimensionally stable nonwoven carbon fiber veil.

Although FIGS. 1-4 and the accompanying description have detailed numerous embodiments of the present invention, several operative principles will be become apparent to one of ordinary skill in the art.

It is well understood by a person of ordinary skill in the art that for a given fiber 22 size, the greater the basis weight of the dimensionally stable nonwoven veil 28, the greater the number or plurality of fibers 22 in a unit volume of the broad good 10, and the lesser the space between fibers 22; thereby, in terms of shielding effectiveness, the greater the frequency bandwidth and/or the greater the highest frequency of shielding coverage provided by the broad good 10. In the first example, the broad good 10 provides a shielding effect of greater than 75 dB in the LF-band (30 kHz-300 kHz), 70 dB in the S-band (2 GHz-4 GHz), and approximately 55 dB in the X-band (8 GHz-12 GHz).

Figure 5:
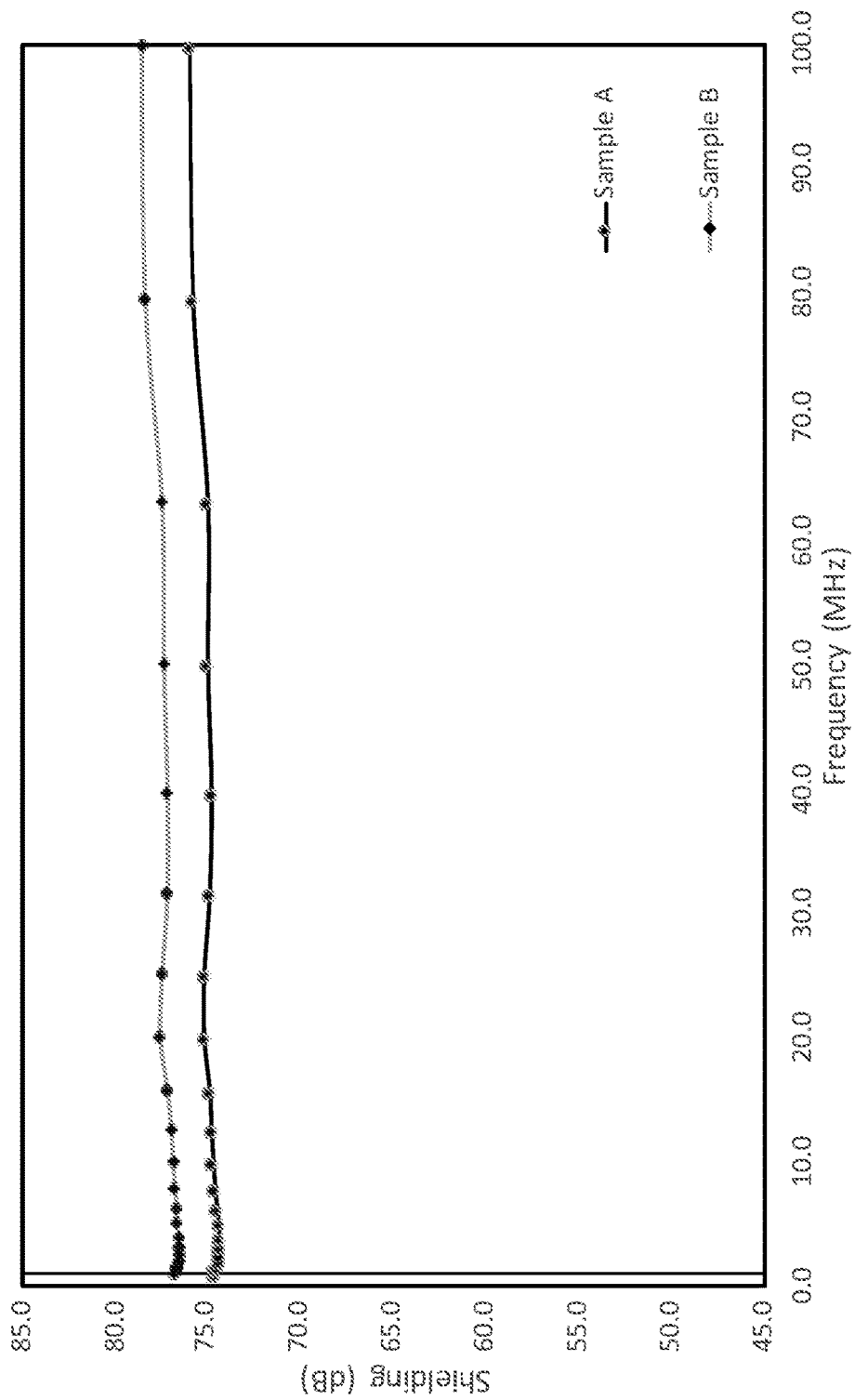
FIG. 5 is a graph of shield effectiveness of two samples of a broad good according to present invention from 1 megahertz (MHz) to 100 megahertz (MHz).
Figure 6:
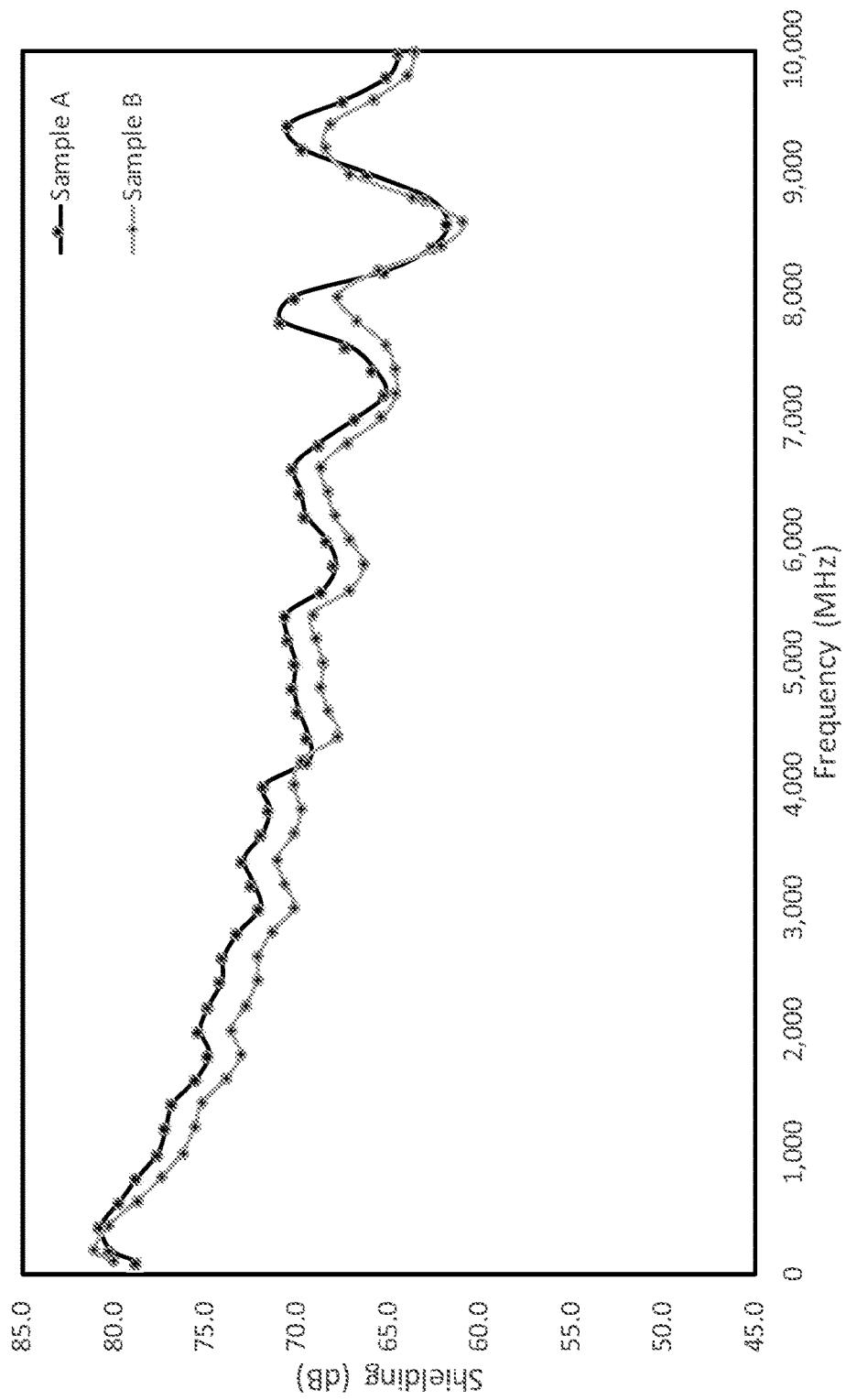
FIG. 6 is a graph of shield effectiveness of two samples of a broad good according to present invention from 100 megahertz (MHz) to 10,000 megahertz (MHz).
Figure 7:
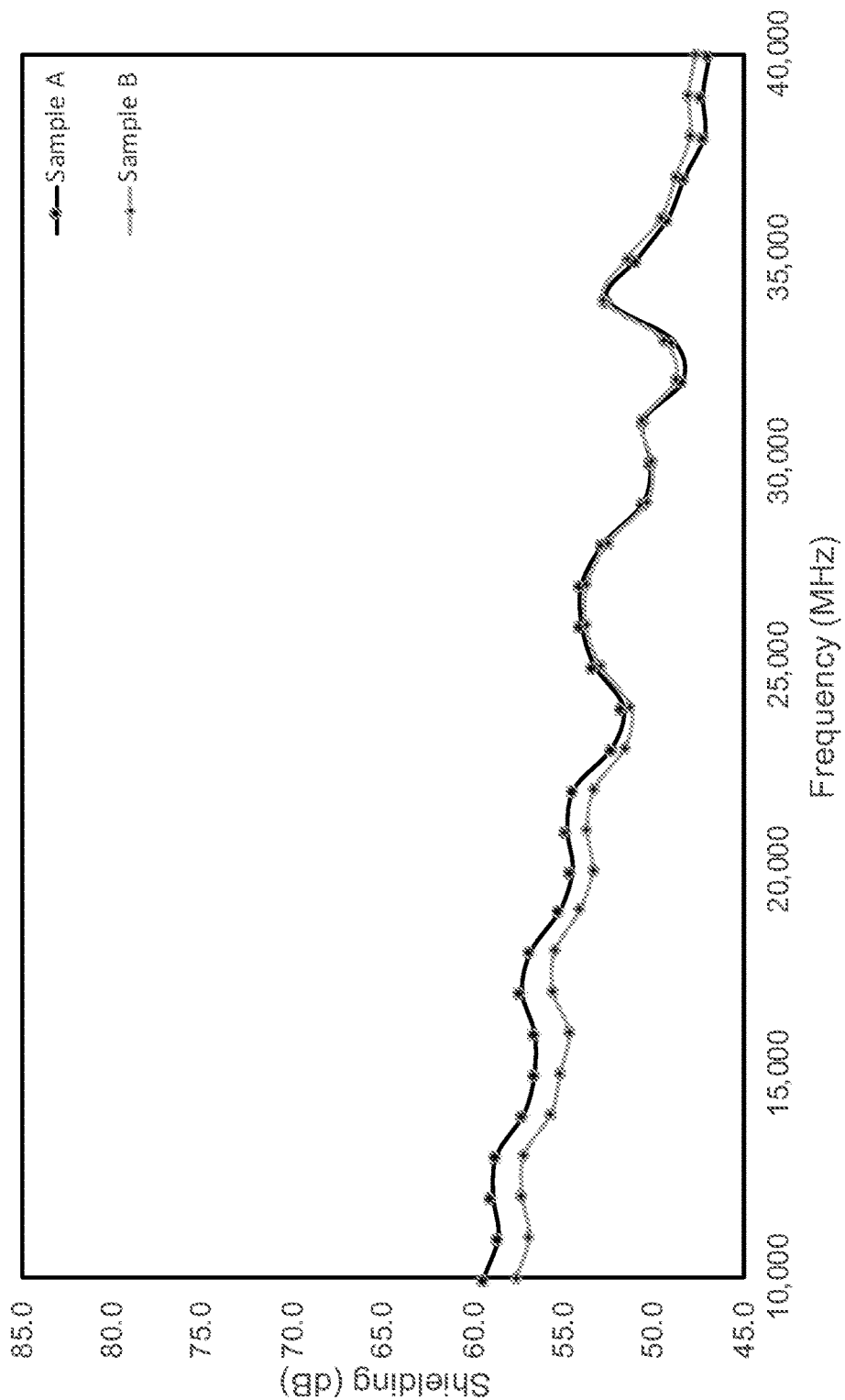
FIG. 7 is a graph of shield effectiveness of two samples of a broad good according to present invention from 10,000 megahertz (MHz) to 40,000 megahertz (MHz).

FIGS. 5-7 shows the results for shielding effectiveness tests for two samples, e.g., Sample A and Sample B, of a broad good 10, the weight of the components being approximately 10 grams per square meter ($g/m^2$) for a dimensionally stable nonwoven carbon fiber veil 28, approximately 30 grams per square meter ($g/m^2$) for a first metal coating 30, consisting of copper, and approximately 10 grams per square meter ($g/m^2$) for a second metal coating 32, consisting of nickel, the total weight of the broad good 10 being approximately 50 grams per square meter ($g/m^2$). The samples were measured using a Damaskos, Inc. Model 1500T coaxial fixture and a 7 millimeter (mm) coaxial line using an Anritsu VectorStar vector network analyzer, Model MS4647B, and an Agilent/Hewlett Packard (HP)S-parameter network analyzer, Model 8753ES, under the control of MU-EPSLN™ for Mac OS X. Measurements using the Model 1500T coaxial fixture were done in full accordance with the American Society for Testing Materials (ASTM) D4935-10 Standard (the Standard). However, the measurements using the 7 millimeter (mm) coaxial were not done in full compliance with the Standard, as it was not possible to cut small, i.e., 0.1 inch (about 3 millimeter (mm)), disc reference pieces for the center conductor. Based on the Model 1500T measurements, the reduction in the shielding effectiveness is less than 1 decibel (dB), which is much less than the noise in the measurement. All measurements were done under ambient conditions, with approximately 40% relative humidity and at 23 degrees Celsius (° C.).

FIG. 5 shows the shielding effectiveness from 1 to 100 megahertz (MHz) measured using the 1500T coaxial fixture and the 8753ES. FIG. 6 shows the shielding effectiveness from 100 to 10,000 megahertz (MHz) measured with the 1500T coaxial fixture and the MS4647B, while FIG. 7 shows the shielding effectiveness from 10,000 to 40,000 megahertz (MHz) using the 7 millimeter (mm) coaxial line and the MS4647B.

As shown in FIG. 5, from 1 to 100 megahertz (MHz), the shielding effectiveness is at least about 10 decibels (dB), at least about 20 decibels (dB), at least about 30 decibels (dB), at least about 40 decibels (dB), at least about 50 decibels (dB), at least about 60 decibels (dB), or at least about 70 decibels (dB). Useful ranges of shielding can be selected from any value between and inclusive of about 10 to about 80 decibels (dB). Non-limiting examples of such ranges can include from about 10 to about 15 decibels (dB), from about 15 to about 20 decibels (dB), from about 20 to about 25 decibels (dB), from about 25 to about 30 decibels (dB), from about 30 to about 35 decibels (dB), from about 35 to about 40 decibels (dB), from about 40 to about 45 decibels (dB), from about 45 to about 50 decibels (dB), from about 55 to about 60 decibels (dB), from about 60 to about 65 decibels (dB), from about 65 to about 70 decibels (dB), from about 70 to about 75 decibels (dB), or from about 75 to about 80 decibels (dB).

As shown in FIG. 6, from 100 to 10,000 megahertz (MHz), the shielding effectiveness is at least about 10 decibels (dB), at least about 20 decibels (dB), at least about 30 decibels (dB), at least about 40 decibels (dB), at least about 50 decibels (dB), or at least about 60 decibels (dB). Useful ranges of shielding can be selected from any value between and inclusive of about 10 to about 65 decibels (dB). Non-limiting examples of such ranges can include from about 10 to about 15 decibels (dB), from about 15 to about 20 decibels (dB), from about 20 to about 25 decibels (dB), from about 25 to about 30 decibels (dB), from about 30 to about 35 decibels (dB), from about 35 to about 40 decibels (dB), from about 40 to about 45 decibels (dB), from about 45 to about 50 decibels (dB), from about 55 to about 60 decibels (dB), or from about 60 to about 65 decibels (dB).

As shown in FIG. 7, from 10,000 to 40,000 megahertz (MHz), the shielding effectiveness is at least about 10 decibels (dB), at least about 15 decibels (dB), at least about 20 decibels (dB), at least about 25 decibels (dB), at least about 30 decibels (dB), at least about 35 decibels (dB), at least about 40 decibels (dB), or at least about 45 decibels (dB). Useful ranges of shielding can be selected from any value between and inclusive of about 10 to about 50 decibels (dB). Non-limiting examples of such ranges can include from about 10 to about 15 decibels (dB), from about 15 to about 20 decibels (dB), from about 20 to about 25 decibels (dB), from about 25 to about 30 decibels (dB), from about 30 to about 35 decibels (dB), from about 35 to about 40 decibels (dB), from about 40 to about 45 decibels (dB), or from about 45 to about 50 decibels (dB).

Referring also to FIGS. 1-4, a person of ordinary skill in the art will appreciate that, generally, as the basis weight of the first and second metal coatings 30, 32 are increased in the broad good 10, the resistance across the width 16 and length 14, i.e., the sheet resistance in terms of ohms per square unit ($\Omega/\square$), of the broad good 10 is decreased. Further, as the weight of the first and second metal coatings 30, 32 are increased, the current carrying capability of the broad good 10 is generally increased. This is particularly important in terms of providing lightning strike protection as is the aforementioned highly conductive metal screen 34. It will be appreciated that pragmatically, the thickness of the first and second metal coatings 30, 32 are not used to specify the sheet resistance as described above as they are on the micron level, i.e., $10^{-6}$ meters, and are more difficult to readily measure. Rather, the measure is the relative weight per unit area of the metal coatings 30, 32; again, typically given in grams per square meter ($g/m^2$).

Further, with respect to shielding effectiveness, and as previously shown and discussed, the relative spacing of the plurality of fibers 22 is what determines the shielding effectiveness at a particular frequency. For example, as the space between a plurality of fibers is decreased or the basis weight of the dimensionally stable nonwoven veil is increased, the shielding effectiveness at higher frequencies is also increased.

For example, for a broad good 10 comprising an approximate 10 grams per square meter ($g/m^2$) dimensionally stable nonwoven carbon fiber veil 28, an approximately 30 grams per square meter ($g/m^2$) first metal coating 30, consisting of copper, and an approximately 10 grams per square meter ($g/m^2$) for a second metal coating 32, consisting of nickel, the total weight of the broad good 10 being approximately 50 grams per square meter ($g/m^2$), or a basis weight of less than 60 grams per square meter ($g/m^2$), exhibits a sheet resistance less than 0.015 ohms per square unit ($\Omega/\square$), the unit in this measure being the resistance of a sheet material with a geometry of that of a square, whereas the conductivity of the material is calculated as the measured sheet resistance divided by the thickness of the sheet. Further, this measure has been found to be consistent across the length 14 and width 16 of broad good 10. This is particularly important as some processes used to coat the dimensionally stable nonwoven veil 28 with the first and second metal coatings 30, 32 can, in some instances, fail to adequately coat the broad good 10 uniformly across the width 16.

Additionally, when appropriately used in the construction an aircraft, the broad good 10 comprising an approximate 10 grams per square meter ($g/m^2$) dimensionally stable nonwoven carbon fiber veil 28, an approximately 30 grams per square meter ($g/m^2$) first metal coating 30, consisting of copper, and an approximately 10 grams per square meter ($g/m^2$) for a second metal coating 32, consisting of nickel, the total weight of the broad good 10 being approximately 50 grams per square meter ($g/m^2$), or a basis weight of less than 60 grams per square meter ($g/m^2$), provides lightning strike protection. Such lightning strike protection may include Zone 1A lightning strike protection wherein the broad good 10 is able to withstand the direct and indirect effects of a 200,000 ampere (A) lightning strike which either directly attaches to the aircraft or occurs nearby and endure an action integral of $2.0 \times 10^6$-$2.5 \times 10^6$ Ampere$^2$-seconds ($A^2$-sec.).

For example, assuming a maximum current density for copper of 100 amps per square millimeter ($A/mm^2$) and a charge density (p) of 8.96 grams per square centimeter ($g/cm^2$) and a maximum current density for nickel of 43 amps per square millimeter ($A/mm^2$) and a charge density (p) of 8.91 grams per square centimeter ($g/cm^2$), the broad good 10 shown, the weight of the components including approximately 10 grams per square meter ($g/m^2$) for the dimensionally stable nonwoven veil 28, comprising a nonwoven carbon fiber veil, approximately 30 grams per square meter ($g/m^2$) for the first metal coating 30, comprising copper, and approximately 10 grams per square meter ($g/m^2$) for the second metal coating 32, comprising nickel, and the total weight of broad good 10 being approximately 50 grams per square meter ($g/m^2$), gives an approximate 3.35 micrometer (μm) copper plus an approximate 1.12 micrometer (μm) nickel, resulting in an approximate 0.34 amps per millimeter (A/mm) plus 0.05 amps per millimeter (A/mm) for copper and nickel, respectively, or an about 0.39 amps per millimeter (A/mm) ampacity for the broad good 10.

Those of ordinary skill in the art will appreciate that the first metal coating comprising copper can vary between a basis weight of approximately 10-50 g/m², and the second metal coating comprising nickel can vary within a basis weight of approximately 5-20 g/m² to provide differing levels of lightning strike protection and/or electromagnetic shielding as desired.

In one embodiment of the present invention, a sheet resistance of 20 milliohms per square unit (mΩ/□) is specified for providing Zone 1A lightning protection, while in another embodiment, a sheet resistance of 40 mΩ/□ is specified for providing Zone 1A lightning protection—at the time of this writing, there is no one universal or agreed upon sheet resistance specification for Zone 1A lightning strike protection, for example. The same is true for the other designated lightning strike zones. Those of ordinary skill in the art will appreciate that different manufacturers of various types of aircraft can have different sheet resistance specifications, each of can be used to select a broad good in accordance with principles of the present invention, based, in part, on that particular company's interpretation of what is necessary for their lightning protection needs, e.g., implementation specifics, safety margin, etc.

Referring once again to FIG. 1, as described, broad good 10 may be used in the construction of various primary and secondary structures in aerospace applications, such as composite panels forming the airframe and/or exterior skin, e.g., fuselage, wings, etc., of an aircraft. Again, when used in these applications, broad good 10 provides lightning strike protection and/or shields associated avionics and electronics from external electromagnetic interference. When so used, broad good 10 channels lightning across the exterior surface of the aircraft protecting and/or shielding.

Further, the processes of chemical vapor deposition (CVD), electroless plating (EL), and/or electroplating (EP), or any combination thereof, can be used to coat dimensionally stable nonwoven veil 28 with the first and second metal coatings 30, 32. An article entitled *Tin-Palladium Catalysts for Electroless Plating* by Gerald A. Krulik, Gerald A. Krulik, *Tin-Palladium Catalysts for Electroless Plating*, 26 Platinum Metals Review 58-64 (1982), details a process for electroless plating (EP) and is incorporated herein by reference in its entirety.

While various embodiments of a broad good offering lightning strike protection have been illustrated by the foregoing description and have been described in considerable detail, it is not intended to restrict or in any way limit the scope of the appended claims to such detail. Additional advantages and modifications will become readily apparent to those skilled in the art.

What is claimed is:

1. A conductive broad good, useful in the construction of an aircraft and in protecting the aircraft from a lightning strike, comprising:
   a plurality of carbon fibers randomly-oriented throughout the conductive broad good;
   a binder material binding the plurality of carbon fibers together, the plurality of bound fibers forming a dimensionally-stable nonwoven veil;
   a first metal coating covering a surface of the plurality of bound fibers and the binder material of the dimensionally-stable nonwoven veil, the first metal coating comprising copper and having a basis weight of about 10-50 g/m²; and
   a second metal coating covering the surface of the first metal coating, the second metal coating comprising nickel and having a basis weight of about 5-20 g/m², wherein the first and second metal coatings form a highly-conductive metal screen that follows the shape of the dimensionally-stable nonwoven veil, and the conductive broad good has a basis weight of less than 60 g/m² and a sheet resistance of less than 0.015 ohms per square (Ω/□).

2. The conductive broad good of claim 1, wherein the binder is a material selected from the group consisting of an acid-resistant binder material, a base-resistant binder material, and a material that is both acid-resistant and base-resistant.

3. The conductive broad good of claim 1, wherein the first metal coating completely covers the surface of the plurality of carbon fibers and the binder material, and the second metal coating completely covers the surface of the first metal coating.

4. The conductive broad good of claim 1, wherein the second metal coating comprises a nickel sulfamate-based electroplated (EP) nickel.

5. The conductive broad good of claim 1, that when used in the construction of a surface of an aircraft, the surface being able to withstand direct and indirect effects of a 200,000 ampere lightning strike, which either directly attaches to the aircraft or occurs nearby; and
   endure an action integral of $2.0 \times 10^6$-$2.5 \times 10^6$ Amps²-sec, thereby preventing structural damage to the aircraft.

6. The conductive broad good of claim 1, having a shielding effect of greater than 75 dB in the LF-band (30 kHz-300 kHz) and approximately 70 dB in the S-band (2 GHz-4 GHz).

7. The conductive broad good of claim 1, having a shielding effect, from 1 megahertz (MHz) to 40,000 MHz, selected from the group consisting of at least about 10 decibels (dB), at least about 15 dB, at least about 20 dB, at least about 25 dB, at least about 30 dB, at least about 35 dB, at least about 40 dB, and at least about 45 dB.

8. The conductive broad good of claim 7, having a shielding effect in a range selected from the group consisting of about 10 to about 15 dB, about 15 to about 20 dB, about 20 to about 25 dB, about 25 to about 30 dB, about 30 to about 35 dB, about 35 to about 40 dB, about 40 to about 45 dB, and about 45 to about 50 dB.

9. The conductive broad good of claim 1, wherein the conductive broad good has a width of 12 inches or more.

10. A flexible, conductive broad good, useful in the construction of an aircraft and in protecting the aircraft from a lightning strike, comprising:
    a dimensionally-stable nonwoven carbon fiber veil comprising a plurality of carbon fibers randomly-oriented throughout the carbon fiber veil, and a binder material binding the plurality of carbon fibers together;
    a first metal coating covering a surface of the plurality of bound carbon fibers and the binder material of the dimensionally-stable nonwoven carbon fiber veil, the first metal coating comprising copper and having a basis weight of about 10-50 g/m²; and
    a second metal coating covering the surface of the first metal coating, the second metal coating comprising nickel and having a basis weight of about 5-20 g/m², wherein the first and second metal coatings form a highly-conductive metal screen that follows the shape of the dimensionally-stable nonwoven carbon fiber veil, the broad good can be bent and folded repeatedly without breaking, and the conductive broad good has a sheet resistance of less than 0.015 ohms per square (Ω/□).

11. The conductive surfacing ply of claim 10, wherein the first metal coating completely covers the surface of the veil mat and the second metal coating completely covers the surface of the first metal coating.

12. The conductive surfacing ply of claim 10, wherein the second metal coating comprises a nickel sulfamate-based EP nickel.

13. The conductive surfacing ply of claim 10, that when used in the construction of a surface of an aircraft, the surface being able to withstand direct and indirect effects of a 200,000 ampere lightning strike, which either directly attaches to the aircraft or occurs nearby; and
endure an action integral of $2.0 \times 10^6$-$2.5 \times 10^6$ Amps$^2$-sec, thereby preventing structural damage to the aircraft.

14. The conductive surfacing ply of claim 10, having a shielding effect of greater than 75 dB in the LF-band (30 kHz-300 kHz) and approximately 70 dB in the S-band (2 GHz-4 GHz).

15. The conductive surfacing ply of claim 10, having a shielding effect, from 1 MHz to 40,000 MHz, selected from the group consisting of at least about 10 dB, at least about 15 dB, at least about 20 dB, at least about 25 dB, at least about 30 dB, at least about 35 dB, at least about 40 dB, and at least about 45 dB.

16. The conductive surfacing ply of claim 15, having a shielding effect in a range selected from the group consisting of about 10 to about 15 dB, about 15 to about 20 dB, about 20 to about 25 dB, about 25 to about 30 (dB, about 30 to about 35 dB, about 35 to about 40 dB, about 40 to about 45 dB, and about 45 to about 50 dB.

17. The conductive surfacing ply of claim 10, wherein the conductive surfacing ply has a width of 12 inches or more.

18. A lightweight highly-conductive sheet, comprising:
a metal-coating carrier comprising a plurality of randomly-oriented, intertwined carbon fibers;
a first metal coating covering the carbon fibers of the carrier, the first metal coating comprising copper and having a basis weight of about 10-50 g/m$^2$; and
a second metal coating covering the surface of the first metal coating, the second metal coating comprising nickel and having a basis weight of about 5-20 g/m$^2$,
wherein the first and second metal coatings form a highly-conductive metal screen that follows the surface of the carbon fibers of the carrier, the lightweight highly-conductive sheet has a basis weight of less than 60 g/m$^2$ and a sheet resistance of less than 0.015 Ω/□.

19. The lightweight highly-conductive sheet of claim 18, wherein the first metal coating completely covers the surface of the carbon fibers of the metal-coating carrier, and the second metal coating completely covers the surface of the first metal coating.

20. The lightweight highly-conductive sheet of claim 18, wherein the second metal coating comprises a nickel sulfamate-based EP nickel.

21. The lightweight highly-conductive sheet of claim 18, that when used in the construction of a surface of an aircraft, the surface being able to withstand direct and indirect effects of a 200,000 ampere lightning strike which either directly attaches to the aircraft or occurs nearby; and
endure an action integral of $2.0 \times 10^6$-$2.5 \times 10^6$ Amps$^2$-sec, thereby preventing structural damage to the aircraft.

22. The lightweight highly-conductive sheet of claim 18, having a shielding effect of greater than 75 dB in the LF-band (30 kHz-300 kHz) and approximately 70 dB in the S-band (2 GHz-4 GHz).

23. The lightweight highly conductive sheet of claim 18, having a shielding effect, from 1 MHz to 40,000 MHz, selected from the group consisting of at least about 10 dB, at least about 15 dB, at least about 20 dB, at least about 25 dB, at least about 30 dB, at least about 35 dB, at least about 40 dB, and at least about 45 dB.

24. The lightweight highly-conductive sheet of claim 23, having a shielding effect in a range selected from the group consisting of about 10 to about 15 dB, about 15 to about 20 dB, about 20 to about 25 dB, about 25 to about 30 dB, about 30 to about 35 dB, about 35 to about 40 dB, about 40 to about 45 dB, and about 45 to about 50 dB.

25. The lightweight highly-conductive sheet of claim 18, wherein the lightweight highly-conductive sheet has a width of 12 inches or more.

\* \* \* \* \*